United States Patent [19]

Morse

[11] 4,445,770

[45] May 1, 1984

[54] FILM PROCESSOR

[75] Inventor: John B. Morse, Boston, Mass.

[73] Assignee: Polaroid Corporation, Cambridge, Mass.

[21] Appl. No.: 471,224

[22] Filed: Mar. 2, 1983

[51] Int. Cl.³ .......................... G03B 5/06; G03B 1/02

[52] U.S. Cl. .................................. 354/303; 354/275; 354/318; 242/74

[58] Field of Search ............... 354/212, 275, 301, 303, 354/304, 305, 318; 242/74, 74.1, 74.2

[56] References Cited

U.S. PATENT DOCUMENTS

| | | | |
|---|---|---|---|
| 2,880,657 | 4/1959 | Bartlett | 354/318 |
| 4,181,271 | 1/1980 | Kluczynski et al. | 242/74 |
| 4,303,325 | 12/1981 | Seely | 354/212 |
| 4,307,955 | 12/1981 | Cocco et al. | 354/303 |
| 4,325,624 | 4/1982 | Pedroli | 354/304 |
| 4,370,045 | 1/1983 | Holmes | 354/304 |
| 4,398,679 | 8/1983 | Kluczynski et al. | 242/74 |
| 4,417,799 | 11/1983 | Mills | 354/304 |

*Primary Examiner*—A. A. Mathews

*Attorney, Agent, or Firm*—Alfred E. Corrigan

[57] ABSTRACT

Apparatus for processing individual rolls of self-developing type transparency film. The apparatus includes a spool having a first post, to which the leaders of a length of photographically exposed film and a length of flexible sheet material are adapted to be attached, and a second post, to which only the leader of the film is to be attached. The spool is adapted to be rotated so as to wind upon the spool a laminate comprised of the film, the sheet material, and a layer of processing liquid sandwiched therebetween for a period of time sufficient to form a visible image in the laminate. After formation of such image, the laminate is unwound from the spool and the film stripped from the sheet material as they are being rewound into their original containers. The posts are constructed such that the leader of the sheet material will automatically become detached from the first post at the end of the unwinding of the laminate thereby allowing the sheet material to be returned completely to its container while the second post maintains its attachment to the film leader. Thus, when the film leader is manually detached from the second post, it is available for withdrawing the processed film from its container for subsequent cutting and mounting of the film's individual frames.

9 Claims, 9 Drawing Figures

FILM PROCESSOR

BACKGROUND OF THE INVENTION

1. Field of the Invention

This invention relates to apparatus for processing individual rolls of photographically exposed film.

2. Description of the Prior Art

The present invention relates to apparatus for processing individual rolls of photographically exposed film, preferably of the 35 mm self-developing or instant type transparency film and, more particularly, to an improved spool construction upon which the film is adapted to be wound for processing.

Lately, interest has been expressed in such apparatus. For example, U.S. Pat. Nos. 4,370,045, and 4,325,624 show film processing apparatus which are adapted for use in the processing of individual rolls of 35 mm instant type transparency film. Each of the apparatus shown in the '045 and '624 patents includes a take-up reel or spool to which the leaders of a roll of exposed film and a roll of flexible sheet material are adapted to be attached; the specific attachment means not being disclosed in the '624 patent while a pin 260 provides the means of attachment in the '045 patent. The spool is then driven in a manner so as to wind a laminate, consisting of the film and sheet material with a layer of processing liquid sandwiched therebetween, upon the spool. The laminate remains on the spool for a period of time sufficient for the processing liquid to form a visible image within the laminate, preferably within the film. Thereafter, the rotatable members upon which the film and sheet material were originally wound are driven in a direction so as to rewind the film and sheet material thereupon while simultaneously unwinding the laminate from the spool and stripping one from the other as they are returned to their original containers. This latter unwinding operation is terminated by the leaders becoming automatically detached from the spool such that they may then be completely returned or rewound into their original containers.

Completely returning the sheet material and the attached by-products of the processing operation, e.g., processing liquid and the film's emulsion layer, to its original container is beneficial insofar as it results in its safe containment. However, if the film is completely rewound into its container (cassette), one must use a tool or other means in order to retrieve the film's leader so as to enable subsequent cutting and mounting of the individual frames in the strip of film.

SUMMARY OF THE INVENTION

The instant invention relates to apparatus for processing a photographic film assemblage of the type which includes a film cassette containing therein a roll of 35 mm instant or self-developing type transparency film. The film cassette is preferably configured so as to be readily received by conventional 35 mm still cameras. The apparatus includes a lighttight housing having a loading door which is pivotally mounted for movement between open and closed positions. The housing is constructed to receive a disposable film processing kit which contains a housing comprised of two sections, one of which is movable between open and closed positions, a roller having a length of flexible sheet material wound thereupon, a container of processing liquid, and a dispenser. The apparatus also includes structure for supporting a film cassette containing a roll of exposed film, and a spool or take-up roller which is adapted to receive the leaders of the sheet material and the film so as to wind the two in superposition upon the take-up roller, as will be further explained later. The take-up roller or spool includes first and second posts to which the leaders are attached via apertures in their free ends. The structural relationship between the posts and apertures is such that the leader of the sheet material will automatically detach itself from the first post when the laminate comprised of the sheet material and film is completely unwound from the take-up roller while the second post maintains its connection with the film leader.

Mounted along one side of the housing of the apparatus is a gearbox containing a power transmission system including a plurality of gears, clutches and drives. One of the drives is adapted to drive the take-up roller during a processing operation while simultaneously the drive to the film's spool and the sheet material's roller is disconnected. Conversely, two of the drives are adapted to power the film spool and sheet material roller during a post processing operation while disconnecting the drive to the take-up roller.

The apparatus further includes a rack and sector gear arrangement which incorporates a lost motion feature. After the film cassette and film processing kit have been loaded into the apparatus and the leaders of the film and sheet material have been attached to the take-up roller, the loading door is closed thereby rendering the apparatus lighttight. A manually operable lever is then rotated through an angle of approximately ninety-five degrees into a processing position. During the first part of such rotation, the sector gear drives the rack in a rearward direction relative to the take-up roller. The rack includes an inwardly extending arm which was located within a recess in one of the two sections of the kit housing during loading of the kit into the processor. As the rack moves rearwardly, its arm moves the one section in a corresponding direction thereby opening the housing and exposing the container of processing liquid. Continued rotation of the lever results in a roller being pivoted into the everincreasing opening caused by the rearward movement of the one housing section of the kit. The roller is pivoted into engagement with the container and ruptures it thereby allowing the processing liquid to flow into the dispenser. Simultaneously with the rearward movement of the rack, the loading door is automatically locked in its closed position and the power transmission system is automatically manipulated such that any subsequent power input by a manually operable crank is directed to the take-up roller. Rotation of the crank drives the take-up roller in a direction which simultaneously unwinds the sheet material from its roller and the film from its spool. As the sheet material is unwound from its spool, it passes beneath the dispenser where a coating of the processing liquid is applied to a gelatin coated surface of the sheet material. That coated surface is then moved into engagement with the emulsion side of the exposed film and directed between a pair of pressure applying rollers to form a laminate which is subsequently wound upon the take-up roller. The laminate remains wrapped upon the take-up roller for a period of time sufficient to form visible images in the laminate, preferably in the film.

After the above-mentioned period of time has elapsed, the operator rotates the lever in an opposite direction so as to return it to its original position. Such rotation not only moves the roller out of the kit, but it also moves the rack forwardly into its original position. The forward movement of the rack results in its arm moving the one housing section into closing relation with the other housing section as the roller moves out of the kit. Simultaneously therewith the rack moves the lock out of latching engagement with the loading door and manipulates the power transmission system such that any subsequent power input by the crank is delivered to the sheet material roller and the film spool rather than to the take-up roller. The crank is then rotated in the same direction as during the processing operation. Such rotation is effective to drive the sheet material roller and the film spool in directions which withdraw or unwind the laminate from the take-up roller while simultaneously stripping the film from the sheet material as the film and the sheet material are rewound upon the spool and roller, respectively. As the last convolution of the laminate is unwound from the take-up roller, the first post automatically releases the leader of the sheet material so that it may be returned completely to its container while the second post maintains the attachment of the film leader to the take-up roller. After the sheet material has been returned to its container, the loading door of the processor may then be opened, the kit containing the used sheet material and any remaining residue of the processing operation removed and safely discarded, the film leader detached from the second post, and the film cassette removed from the processor. The processed film may then be removed from its cassette, and the individual scenes in the processed film cut and mounted in frames for subsequent viewing.

An object of the invention is to provide a film processor with a rotatable spool having means for automatically releasing its connection with a leader of a length of sheet material as its last convolution is unwound from the spool while simultaneously maintaining its connection to a film leader.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein.

DETAILED DESCRIPTION OF THE INVENTION

Figure 1:
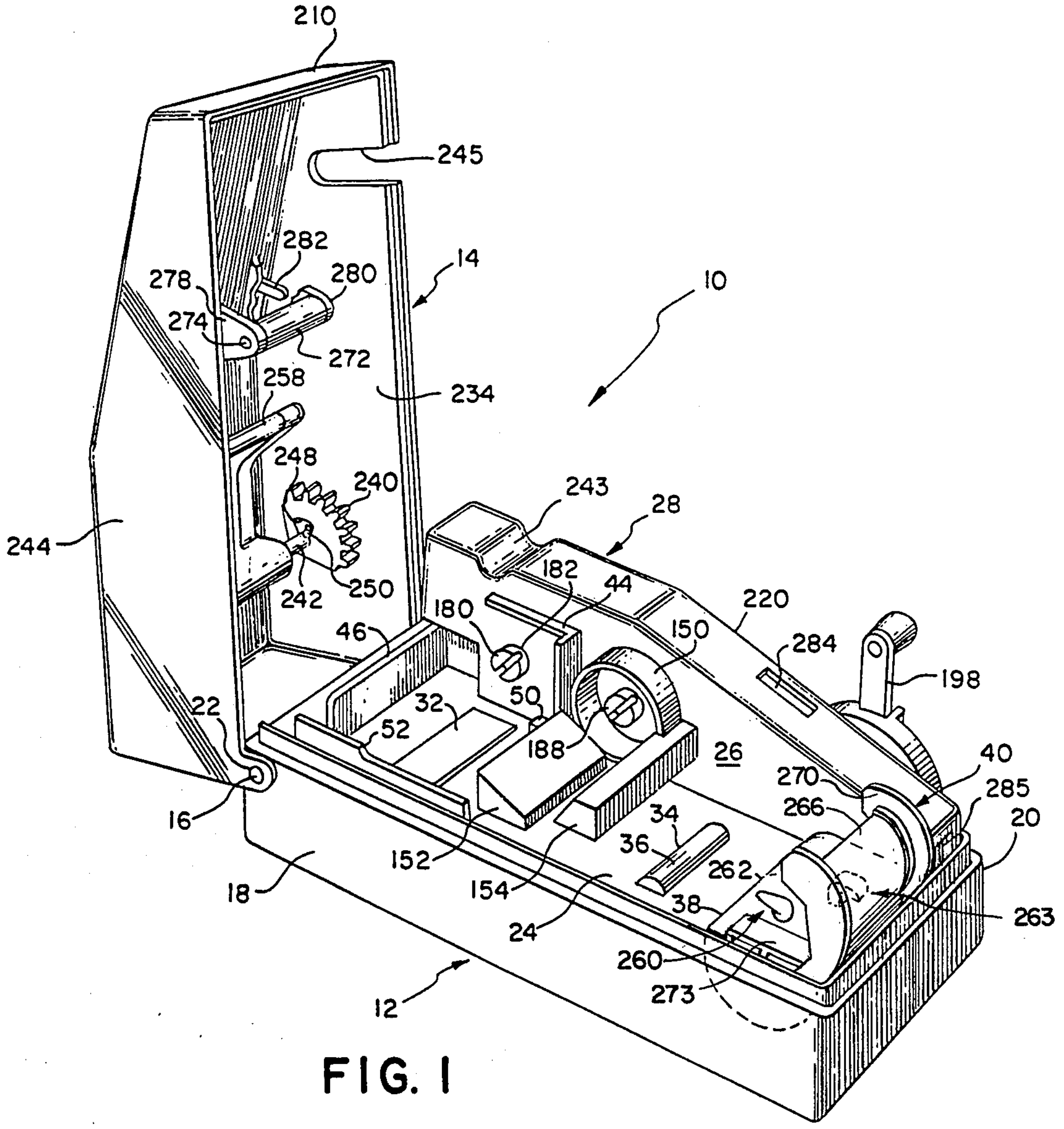
FIG. 1 is a perspective view of a preferred form of apparatus for use in processing a length of exposed film.
Figure 2:
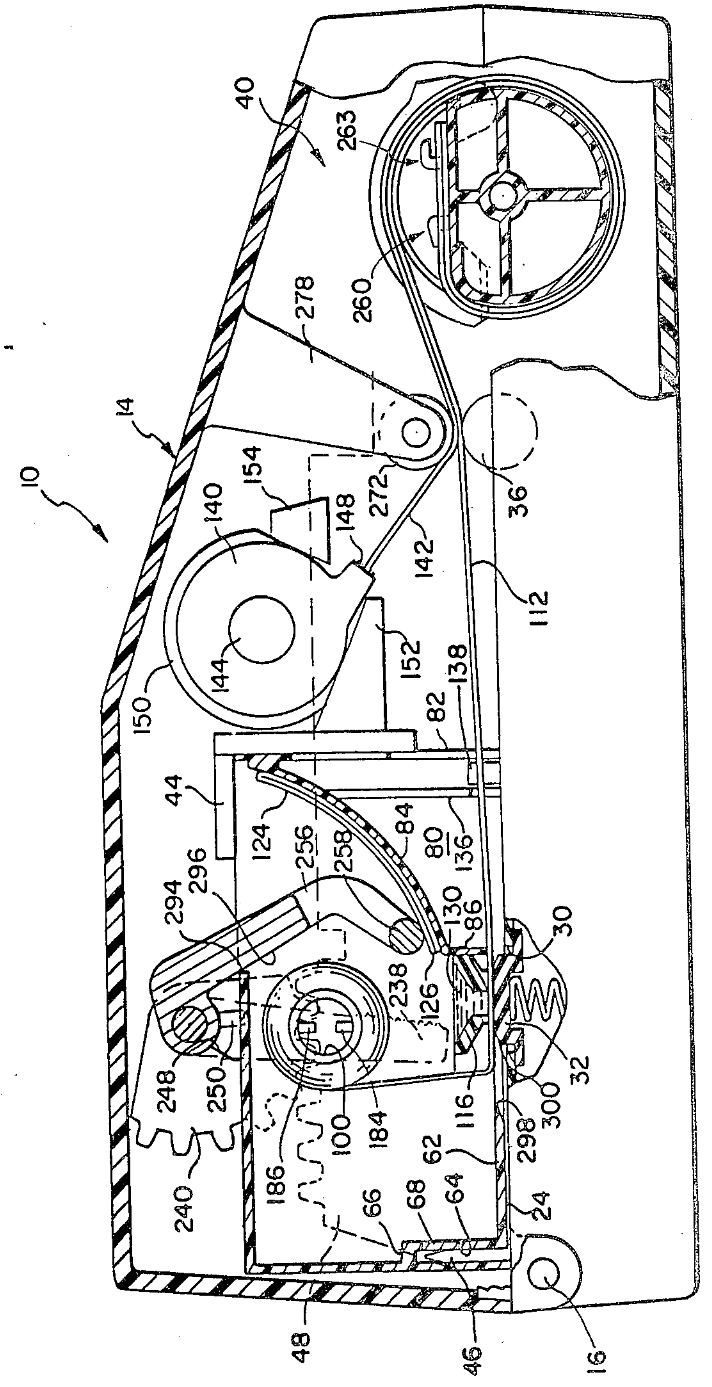
FIG. 2 is a side elevational view of the apparatus of FIG. 1, the apparatus being shown with its loading door in a closed position, certain parts being omitted or sectioned for reasons of clarity.

Reference is now made to the drawings and, in particular, to FIGS. 1 and 2 wherein is shown a preferred form of an apparatus 10 for processing a roll of exposed film, the film preferably being of the 35 mm instant or self-developing type transparency film. The apparatus 10 includes a housing 12 having a loading door 14 pivotally coupled at one end thereof by a pair of pins 16 (only one being shown) which extend outwardly from opposite side walls 18 and 20 of the housing 12 and are received by apertures 22 (only one being shown) in the loading door 14. Movement of the loading door 14 into its closed position (see FIG. 2) renders the housing 12 lighttight.

A generally horizontal support 24 extends between the side wall 18 and a side wall 26 of a gearbox 28. The support includes a first opening 30 through which a spring-biased plate 32 is adapted to extend, a second opening 34 through which a portion of a roller 36 is adapted to extend, and a third opening 38 through which a portion of a take-up roller or spool 40 is adapted to extend. Both the roller 36 and the take-up roller 40 are suitably mounted for rotation about their respective axes by means not shown.

The apparatus 10 also includes means for locating a film processing kit 42 in its proper position relative to other elements of the apparatus 10. Generally, these means include an L-shaped flange 44 which extends inwardly from the side wall 26 of the gearbox 28, an arm 46 which extends at a right angle to a rack 48 (see FIG. 4), a pair of cams 50 (only one being shown) which are located adjacent opposite sides of the horizontal support 24, and a plate 52 which extends along the side wall 18.

Figure 6A:
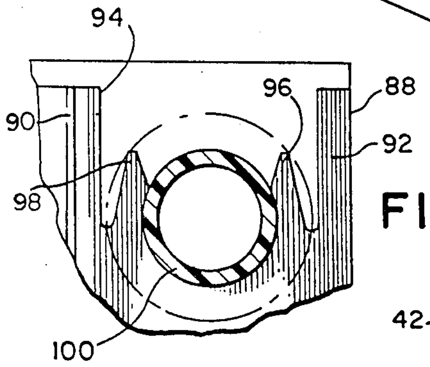
FIG. 6*a* is a side elevational view of a portion of the film processing kit.
Figure 6:
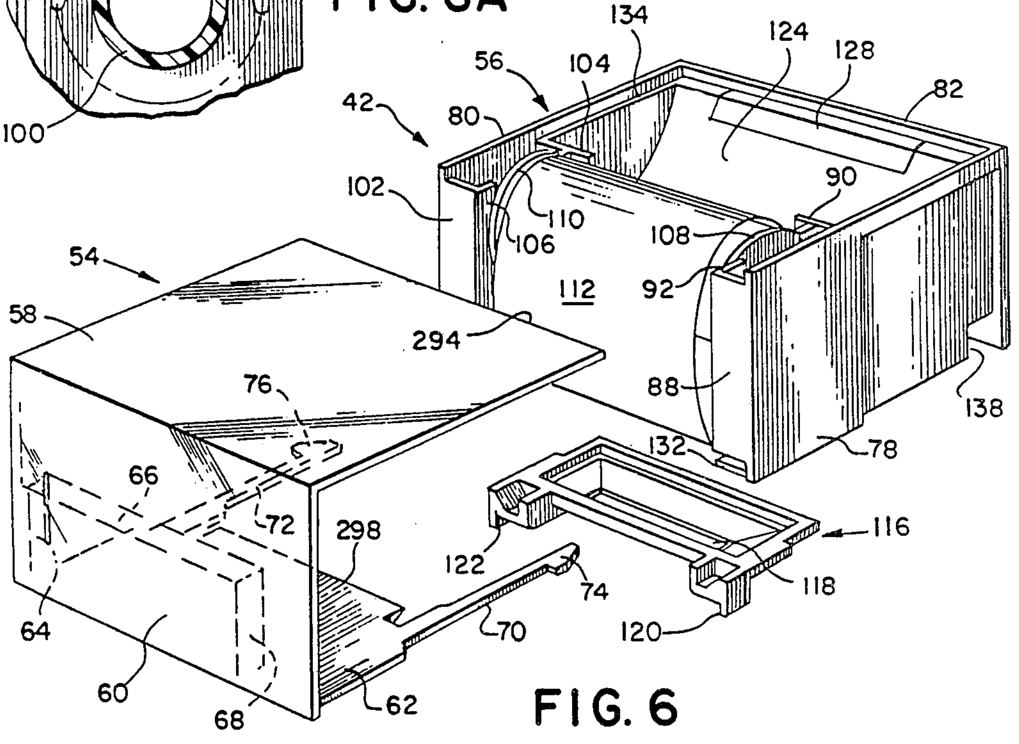
FIG. 6 is a partly exploded perspective view of a disposable film processing kit which is especially adapted for use with the apparatus shown in FIG. 1.

The film processing kit, as best shown in FIG. 6, includes a housing consisting of a first section 54 and a second section 56 which is constructed to telescopically receive the first section 54. The first section includes a top wall 58, an end wall 60, and a bottom wall 62. The end wall 60, as best seen in FIG. 2, includes a passageway 64 formed by a generally horizontal flange 66 and a vertical flange 68 for receiving the arm 46 of the link 48. The bottom wall 62, which has a length slightly less than one-half that of the top wall 58, includes a laterally spaced pair of fingers 70 and 72 whose ends are provided with tapered latching members 74 and 76, respectively.

The second section 56 includes a pair of side walls 78 and 80 interconnected at one end by an end wall 82. A gently curving wall 84 extends between the side walls 78 and 80 and slopes downwardly from the top of the end wall 82 to a point where it terminates in a generally vertical wall 86. A pair of flanges 88 and 90 extend inwardly from the side wall 78 to a point where they are interconnected by a wall 92 (see FIG. *6a*). The wall 92 has a U-shaped opening 94 therein. A pair of resilient fingers 96 and 98, which are integral with the wall 92, extend into the U-shaped opening. As best seen in FIG. *6a*, the resilient fingers 96 and 98 are adapted to be moved away from each other as the end of a roller 100 is moved downwardly into the U-shaped opening 94 to thereby provide a drag on the end of the roller 100. A pair of flanges 102 and 104 extend inwardly from the side wall 80 to a point where they are interconnected by a wall 106 having a U-shaped opening (not shown) therein for rotatably receiving the opposite end of the roller 100. The roller 100 has a pair of annular flanges 108 and 110 which are adapted to be positioned between the walls 92 and 106. A length of sheet material 112, e.g., a polyester film such as Mylar having a gelatin coating on one side, is coiled about the roller 100 with a trailing end secured to the roller 100 and a leading end or leader 114 which is adapted to be releasably attached to an exterior surface of the end wall 82. An opening (not shown) is located in wall 80 in alignment with the end of the roller 100 so as to enable a drive member to protrude therethrough and drivingly engage the roller 100, as will be further explained later.

Also mounted in the second section 56 is a processing liquid dispenser 116. The dispenser includes a nozzle 118 and a pair of laterally spaced flanges 120 and 122 which function to restrain sidewise movement of the sheet material 112 as it passes beneath the nozzle 118. The nozzle has a length which is less than the width of the sheet material 112 and is approximately equal to the distance between laterally spaced sprocket holes in a strip of 35 mm film, i.e., two and one-half centimeters.

A container 124 having a rupturable end 126, see FIG. 2, is supported on the wall 84 by any suitable means, e.g., by a strip of adhesive tape 128. The container 124 holds a supply of viscous processing liquid 130, the quantity of which is sufficient to coat substantially the entire length of the sheet material 112.

A flange 132 extends inwardly from the bottom of the side wall 78. The flange 132 cooperates with a similar flange (not shown) which extends inwardly from the side wall 80 to guide the lateral edges of the bottom wall 62 as the second section 56 telescopically receives the first section 54 during closing of the kit 42. A recessed area 134 extends around portions of the side walls 78 and 80 and the end wall 82 and cooperates with the tops of the flanges 88, 90, 102 and 104 to receive the edges of the top wall 58. As the edge of the top wall 58 moves into engagement with the end wall 82, the latching members 74 and 76 are first cammed inwardly toward each other by a pair of flanges 136 (only one being shown) which extend inwardly from the side walls 78 and 80. The members 74 and 76 then spring outwardly to grab the right side, as viewed in FIG. 2, of the flanges 136 thereby locking the two sections 54 and 56 in the closed position, with the bottom wall 62 holding the sheet material 112 in sealing relation to the nozzle 118. The latching members 74 and 76 are adapted to be moved out of latching engagement with the flanges 136 by the cams 50 in the apparatus 10 as the kit is being loaded in the apparatus. During such loading, the cams 50 enter a pair of apertures 138 (only one being shown) located in the side walls 78 and 80 and force the latching members 74 and 76 inwardly toward each.

The apparatus 10 further includes means for supporting a film cassette 140 containing a roll of exposed, self-developing type transparency film 142, the film being wound upon a rotatable film spool 144 with one end of the film being secured to the film spool 144 and its opposite end or leader 146 being adapted to extend to the exterior of the film cassette via a film withdrawal slot 148. These means include a semi-annular flange 150, which is adapted to receive one end of the generally cylindrical film cassette 140, and a pair of supports 152 and 154.

Figure 5:
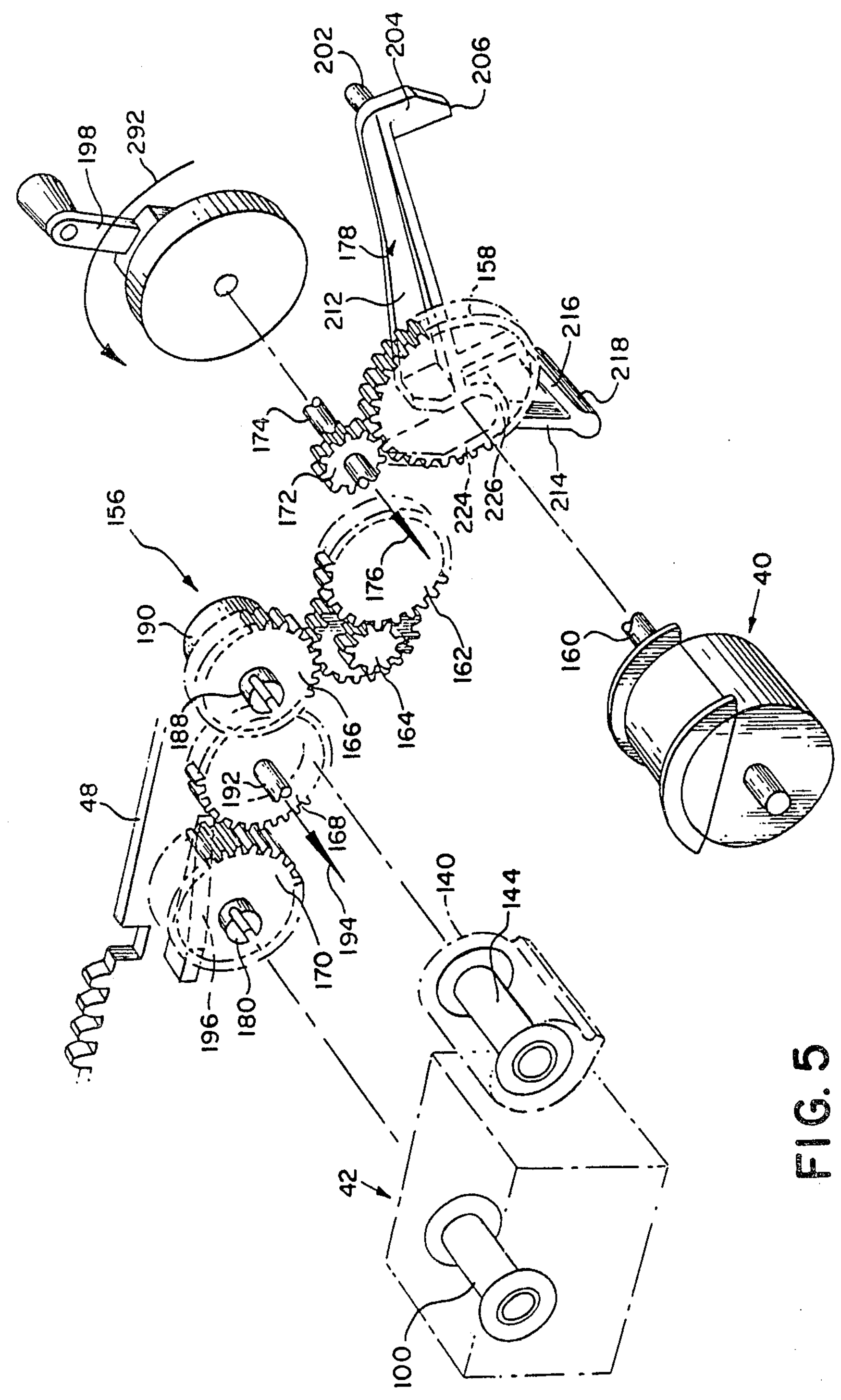
FIG. 5 is a schematic representation of the apparatus' power transmission system and its relation to various other elements which are part of or usable with the instant invention.

A power transmission means 156 is mounted within the gearbox 28. As shown in FIG. 5, the power transmission means 156 includes a first power path consisting of a gear 158 which is fixedly attached to a shaft 160 which, in turn, is fixedly attached to the take-up roller 40, a second power path consisting of gears 162, 164 (compound), 166, 168 and 170, and an element, i.e., a gear 172. The gear 172 is mounted on a shaft 174 for limited axial movement between a first position wherein it is solely in drivable engagement with the second power path and a second position (shown in FIG. 5) wherein it is solely in drivable engagement with the first power path. The gear 172 is normally biased into engagement with the gear 158 and is adapted to be moved in the direction of the arrow 176 into engagement with the gear 162 by a bell crank 178, as will be further explained shortly. A slotted drive member 180 extends from the face of the gear 170 and protrudes through an opening 182 in the wall 26 of the gearbox 28 where it is adapted to drivingly engage a pair of tabs 184 and 186 (see FIG. 2) which are integrally formed with the roller 100. A similar drive member 188 extends from the face of the gear 166 and protrudes through an aperture in the side wall 26 where it is adapted to be located in driving engagement with the end of the film spool 144. A clutch 190 is coupled between the gear 166 and its drive member 188 to allow slippage therebetween during the time that the roller 100 and film spool 144 are being driven, thereby compensating for any differences in the increasing diameters of the roll of sheet material 112 and the film 142. It will also be noted that the gear 168 is mounted for limited linear movement along its shaft 192. The gear is normally biased out of engagement with the gear 166 when the take-up roller 40 is being driven and is adapted to be moved in the direction of the arrow 194 into driving engagement with the gear 166 by a cam 196 located on the side of the rack 48, as will be more fully explained hereinafter. The power input to the power transmission means 156 includes a manually operable hand crank 198 which is fixedly attached to the shaft 174 at a point where the shaft 174 protrudes through the side wall 20 of the apparatus 10.

Figure 3:
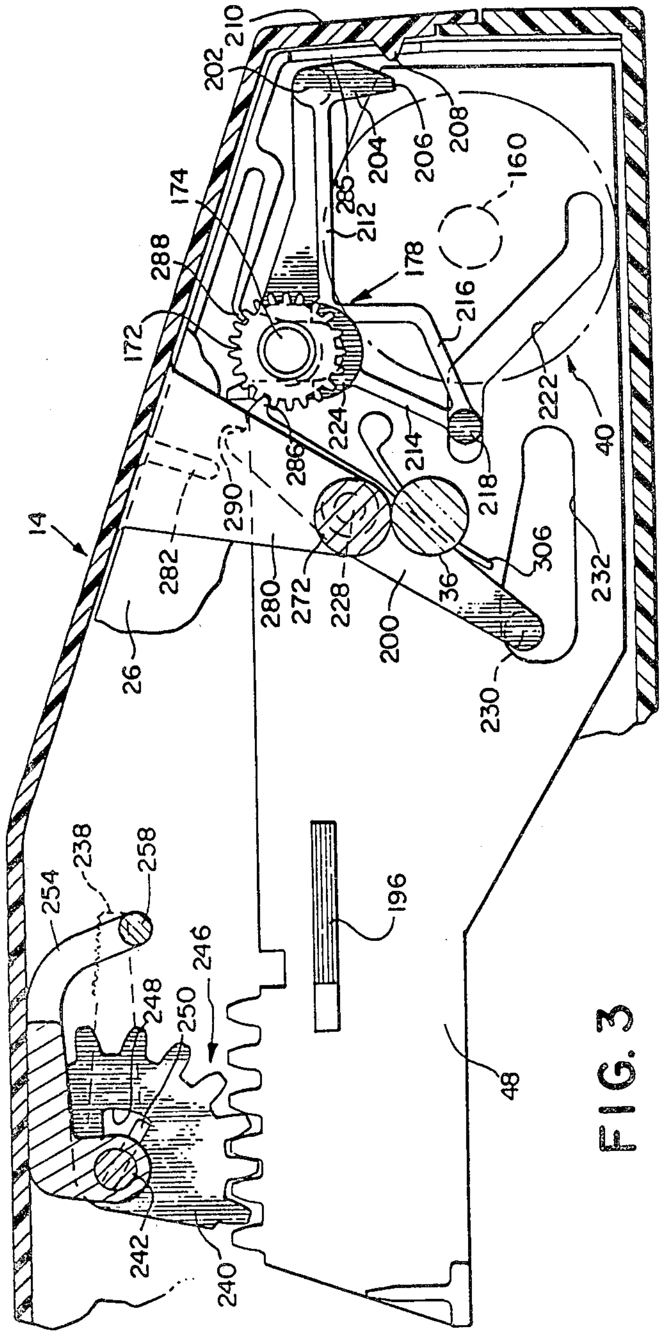
FIG. 3 is an enlarged side elevational view, partly in section, of a portion of the apparatus of FIG. 1.
Figure 4:
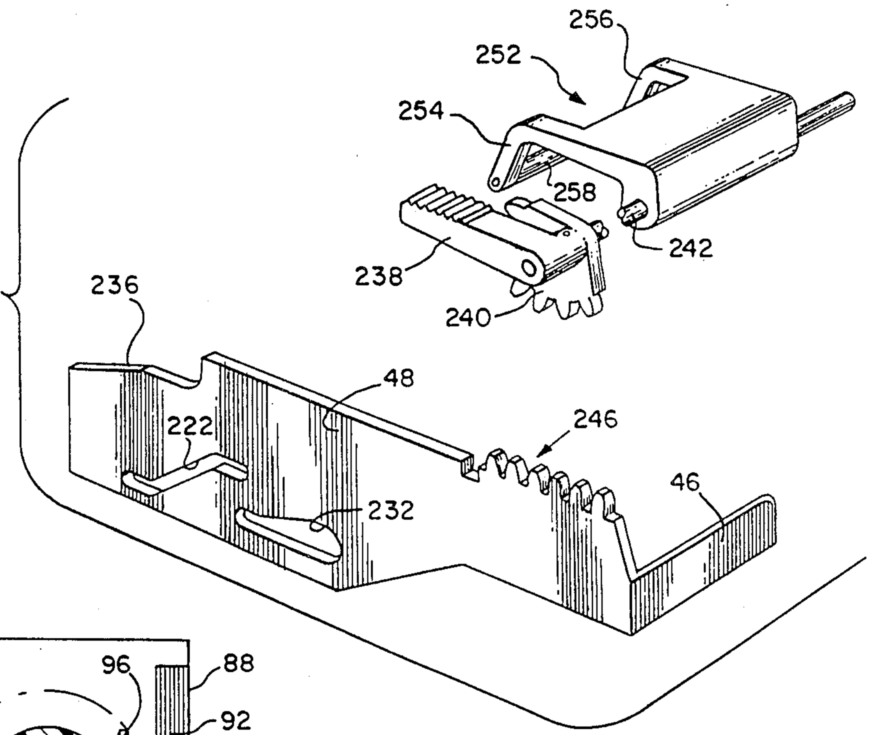
FIG. 4 is an exploded perspective view of a lost motion system.

Reference is now made to FIG. 3 wherein the operation of the bell crank 178 will be more fully described. In this view, the take-up roller 40 is shown in phantom lines so as to facilitate an understanding of the movement of the bell crank 178. Further, although the bell crank 178 and a juxtaposed link 200 are located within the gearbox 28, the power transmission system 156, except for gear 172, has been omitted for reasons of clarity. The bell crank 178 and the link 200 are adapted to interrelate with the rack 48 to provide a plurality of functions. Specifically, the bell crank 178 is pivotally coupled to a wall of the gearbox 28 by a pin 202 which extends outwardly from the bell crank 178. One arm 204 of the bell crank 178 includes a latching surface 206 which is adapted to be moved into engagement with a lip 208 formed on the interior surface of an end wall 210 of the loading door 14 so as to lock it in the closed position. The other arm 212 of the bell crank 178 includes a pair of downwardly converging legs 214 and 216 which are joined at their end by a cam follower 218 which extends at right angles to a plane containing the legs 214 and 216. The cam follower 218 extends through an arcuate slot (not shown) in a side wall 220 to a point where its end terminates in a cam slot 222 in the rack 48. The upper left-hand end of the arm 212 includes a U-shaped portion 224 having inclined camming surfaces 226 (see FIG. 5). The U-shaped portion 224 is constructed to move the gear 172, against its spring bias, from engagement with the gear 158 and into engagement with the gear 162 when the bell crank 178 is rotated in a clockwise direction about its pivot pin 202. The link 200 is pivotally connected intermediate its ends by a pin 228 which extends between the side walls 26 and 220 of the gearbox 28. One end of the link 200 includes a cam follower 230 which extends at right angles thereto. The cam follower 230 protrudes through another arcuate slot (not shown) in the side wall 220 and terminates at a location within a second cam slot 232 in the rack 48. The rack 48 is supported by means (not shown) between the side wall 220 and a side wall 234 of the loading door 14. As best seen in FIG. 4, one end of the rack 48 is cut away at 236 to provide clearance for the shaft 74 of the crank 198 when the rack 48 is reciprocated into the position shown in FIG. 3.

The rack 48 is adapted to be reciprocated from a first position, as shown in FIG. 3, to a second position, as shown in FIGS. 2 and 5. The mechanism for reciprocating the rack 48 includes a manually operable lever 238 which is fixedly coupled to a sector gear 240, and the two are freely rotatable on a shaft 242 which has its opposite ends journaled in the side walls 234 and 244 of the loading door 14. The teeth of the sector gear 240 are adapted to drivingly engage a set of teeth 246 located in the top edge of the rack 48 when the loading door 14 is in the closed position. The sector gear 240 includes an aperture 248 which is adapted to receive a pin 250 which extends radially outward from the shaft 242 to define a lost motion connection between the lever 238 and a processing fluid container rupturing mechanism 252. The mechanism 252, which is integrally formed with the shaft 242, includes a pair of arms 254 and 256 which rotatably support a roller 258 therebetween.

Figure 7:
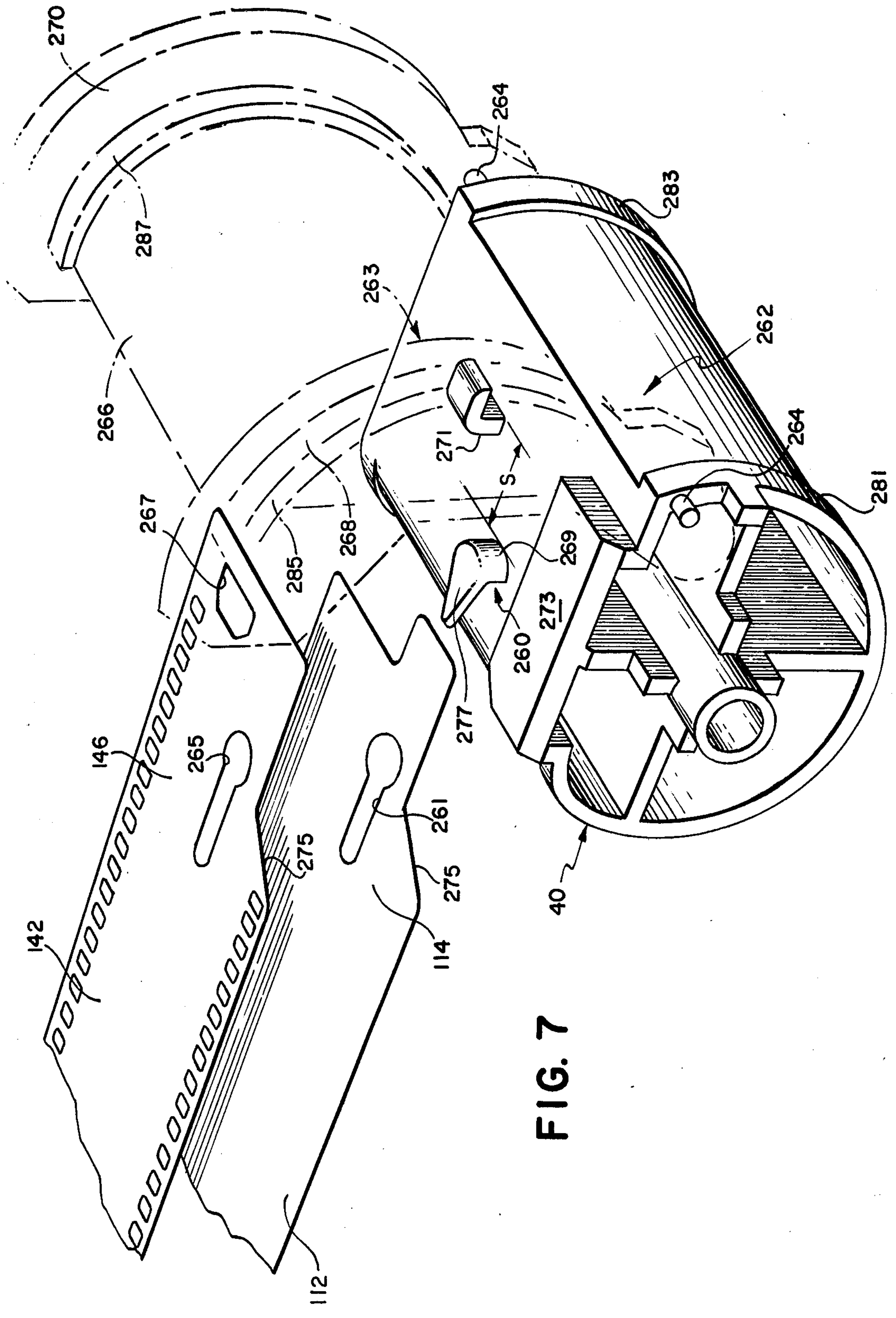
FIG. 7 is an enlarged perspective view of the apparatus' take-up roller or spool and its relationship to a pair of leaders having apertures in their free ends.
Figure 8:
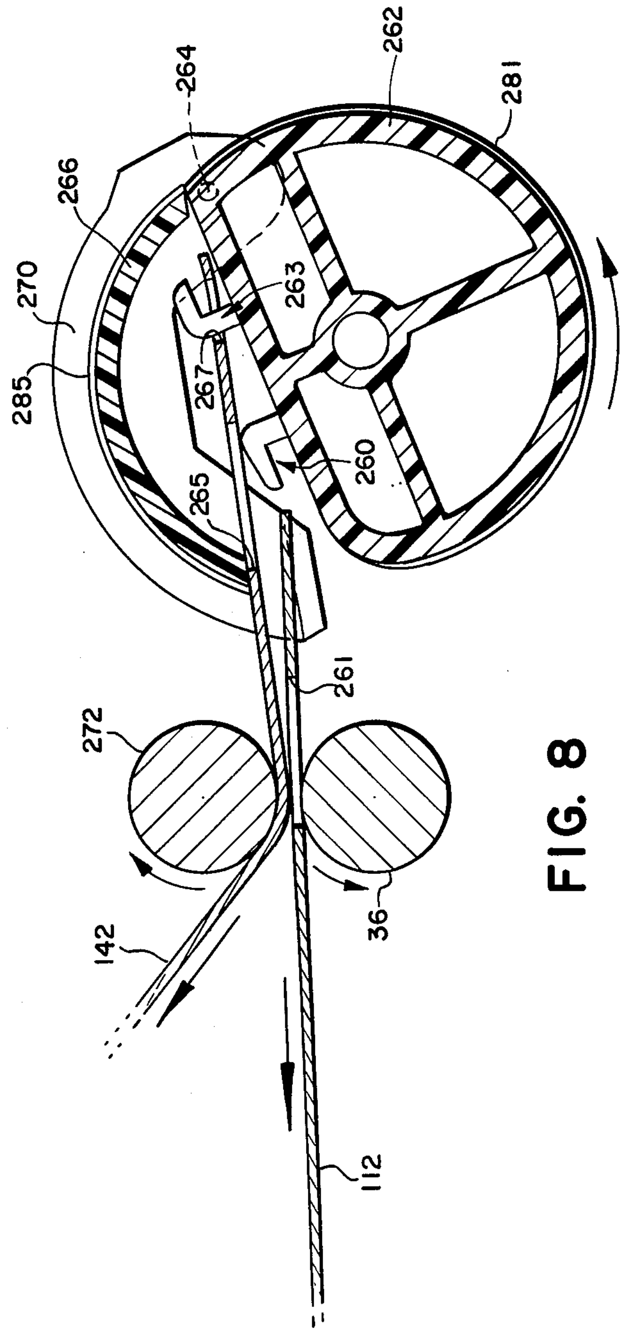
FIG. 8 is an enlarged side elevational view, partly in section, depicting the relationship between the take-up roller and the pair of leaders at the time of detachment of one of the leaders from the take-up roller.

In the operation of the apparatus 10, a closed kit 42 is positioned within the apparatus 10 such that the drive member 180 engages the drive flanges 184 and 186 of the sheet material roller 100, the arm 46 of the rack extends into the passageway 64 and the cams 50 enter the apertures 138 in the side walls 78 and 80 of the second section 56 of the kit 42 thereby moving the latching members 74 and 76 into an inoperative position. Also, the leader 114 of the sheet material 112 is detached from the end wall 82 of the kit 42 and trailed across the roller 36 and finally attached to a first post 260, which extends upwardly from a section 262 of the take-up roller 40, via a keyhole shaped aperture 261. As best shown in FIG. 7, the section 262 is pivotally connected by hinge pins 264 to a second section 266 of the take-up roller 40. The second section 266 includes flanges 268 and 270 at opposite ends thereof for guiding the sheet material 112 and the film 142 onto laterally spaced shoulders 281 and 283 on the first section 262 and shoulders 285 and 287 on the second section of the take-up spool 40 during clockwise rotation of the latter. Next, the film cassette 140 containing the exposed roll of film 142 is loaded into the apparatus 10 such that the drive member 188 drivingly engages the end of the film spool 144 and the members 152 and 154 support the film cassette 140, as shown in FIG. 2. The leader 146 of the film 142 is then attached to the first post 260 and to a second post 263 such that the emulsion side of the film 142 faces the gel coated surface of the sheet material 112. The leader 146 is provided with a first aperture 265, having a configuration substantially identical to that of aperture 261, which is adapted to receive the first post 260. The film leader 146 is also provided with a second aperture 267 which is adapted to receive the second post 263. The minimum spacing S between a curved surface 269 of the first post 260 and a vertical portion 271 of the second post 263 is less than the corresponding spacing between the right-hand edges of first and second apertures 265 and 267 in the film leader thereby assuring that rotative force of the take-up roller or spool 40 is transferred to the leaders 114 and 146 via the engagement of the curved surface 269 with the right-hand ends of the apertures 261 and 265. Further, the first section 262 of the spool 40 is provided with a raised rectangular portion 273 which, when taken in conjunction with the cut-out portion 275 in each of the leaders 114 and 146 assists the user in the correct orientation of the leaders with respect to the spool 40. The second section 266 is then pivoted into superposition with the first section 262. The loading door is then closed thereby bringing a roller 272 into superposition with the roller 36. The journals 274 of the roller 272 are suitably supported in the ends of a pair of supporting arms 278 and 280 which extend downwardly from the loading door 14. The closing of the loading door 14 also moves (1) the teeth of the sector gear 240 into mesh with the gear teeth 246, and (2) a latch pin 282, which extends downwardly from the loading door 14, into the gearbox 28 via an opening 284 therein. With the loading door 14 closed, thereby rendering the apparatus lighttight, the elements shown in FIG. 3 are positioned as shown. The gearbox 28 is recessed at 243 to accommodate the shaft 242, and the door 14 is cut away at 245 to provide clearance for the shaft of the crank 198 when the door 14 is in the closed position.

Processing of the film 142 is initiated by the operator turning the lever 238 from a non-processing position shown in FIG. 3 to a processing position shown in FIG. 2. Initial rotation of the lever 238 into the processing position is immediately transferred to the rack 48 via the teeth of the sector gear 240 thereby moving the rack 48 rearwardly, i.e., to the left as viewed in FIGS. 2 and 3. This movement of the rack 48 causes several events to occur. Specifically, as the rack 48 moves to the left, the cam slots 222 and 232 therein cause the bell crank 178 and the link 200 to rotate in a counterclockwise direction about their respective pivots 202 and 228, respectively. Such rotation of the bell crank 178 results in its U-shaped portion 224 moving downwardly out of engagement with the gear 172 thereby enabling it to return, under its spring bias, to its normal position in engagement with the gear 158, as shown in FIG. 5. Simultaneously therewith, the latching surface 206 of the end 204 of the bell crank 178 has rotated through an opening 285 in the gearbox 28 into latching relation to the lip 208 thereby precluding accidental opening of the loading door 14 at this time in the processing cycle. The rotation of the link 200 functions to remove a pawl 286, which is an integral part of the link 200, from engagement with the teeth of the gear 172 thereby permitting subsequent counterclockwise rotation thereof. The pawl 286 of the link 200 is held out of engagement with the gear 172 by the latch pin 282 which enters a recess 290 in the top of the link 200. The latch pin 282 will continue to maintain the pawl 286 out of engagement with the gear 172 until the loading door 14 is opened. Clockwise rotation of the gear 172 is prevented by a second pawl 288 which extends downwardly from the top wall of the gearbox 28 into engagement with the teeth of the gear 172. The rearward movement of the rack 48 also moves the cam 196 in a direction which enables the gear 168 to move, under its spring bias, along the shaft 192 to a position wherein it is no longer in engagement with the gear 166. Further, rearward movement of the rack 48 is effective to cause its arm 46 to move the first section 54 of the kit 42 away from the second section 56 (the second section 56 being maintained in position by the cams 50) thereby opening the kit prior to the rupturing mechanism 252 being rotated toward the container 124.

After the lever 238 has been rotated through an angle of approximately twenty-three degrees, the right side (as viewed in FIG. 2) of the aperture 248 in the sector gear 240 moves into engagement with the pin 250 thereby causing any continued rotation of the lever 238 toward the processing position to not only continue the rearward movement of the rack 48 but also to commence the rotation of the rupturing mechanism 252 toward the position shown in FIG. 2. Because of the aforedescribed lost motion connection between the lever 238 and the pin 250, the roller 258 moves into the kit 42 as its top wall 58 moves out of interference therewith. The roller 258 engages the container 124 and increases the pressure on the processing liquid 130 therein to a point where the end 126 of the container ruptures. Continued clockwise rotation of the roller 258 about its pivot pin 242 causes the roller 258 to force the processing liquid from the container 124 into the dispenser 116.

Once the lever 238 is in the processing position, as shown in FIG. 2, the operator rotates the crank 198 in the direction of the arrow 292 thereby providing a power input to the first power path, i.e., the gear 158, to rotate the take-up roller 40 in a clockwise direction, as viewed in FIG. 2. Such rotation of the take-up roller 40 is effective to withdraw the sheet material 112 from its roller 100, move it past the nozzle 118 of the dispenser 116, whereat it is resiliently urged into engagement with the nozzle 118 by the plate 32 such that a uniform coating of the processing liquid 130 may be applied thereto, and then toward the bite of the rollers 36 and 272 where it will be married with the film 142 (which is also being withdrawn from its cassette 140). The rollers 36 and 272 press the gel coated surface of the sheet material 112 into engagement with the emulsion side of the exposed film 142 so as to form a laminate comprised of a layer of processing liquid 130 sandwiched between the sheet material 112 and the exposed film 142. The resulting laminate is then wound upon the take-up roller 40. When the sheet material 112 and/or the film 142 have been completely uncoiled from their respective supports, but not detached therefrom, the resultant increase in tension in the laminate is automatically fed back to the crank 198 thereby signaling the operator to stop rotating the crank 198. To prevent any damage to the apparatus 10 or the laminate, a clutch may be coupled between the shaft 174 and the crank 198 so that further rotation of the crank 198 by the operator is not transferred to the shaft 174. The laminate is then allowed to remain upon the take-up roller 40 for a period of time, e.g., one minute, which is sufficient for visible images to be formed in the laminate, preferably in the film 142.

After the formation of the visible images within the laminate has been substantially completed, the lever 238 is rotated in a counterclockwise direction, as viewed in FIG. 2, toward the non-processing or post processing position. Such rotation is effective to immediately drive the rack 48 forwardly toward the take-up roller 40 while simultaneously moving the first section 54 of the kit 42 into closing relation with the second section 56. Although initial rotation of the lever 238 is not transferred to the rupturing mechanism 252 because of the aforedescribed lost motion connection, the mechanism 252 is given a head start due to an edge 294 of the top wall 58 of the first section 54 engaging the undersurface 296 of the mechanism and pivoting it upwardly until such time that the left side of the aperture 248 engages the pin 250 so as to complete the movement of the rupturing mechanism 252 out of the kit 42 before it closes. Further, it should be noted that an edge 298 of the bottom wall 62 of the first section 54 is beveled such that it may cooperate with a radius 300 on the spring biased plate 32 so as to urge the plate 32 downwardly thereby enabling the edge 298 to pass to a point where the bottom wall 62 seals the nozzle 118. Movement of the rack 48 from its rearward or processing position, as shown in FIG. 2, to its forward or post processing position, as shown in FIG. 3, also effects a clockwise rotation of the bell crank 178 due to the cam slot 222 and cam follower 218 relationship. This rotation pivots the end 206 of the arm 204 out of latching relation with the lip 208. It also results in the U-shaped section 224 moving upwardly into contact with the gear 172 such that its cam surface 226 will move the gear 172 out of engagement with the gear 158 and into engagement with the gear 162. Further, the cam 196 on the rack moves the gear 168 back into engagement with the gear 166. However, the movement of the rack 48 into the post processing position does not affect the position of the link 200 since the pin 290 maintains it in a position wherein the pawl 286 is held, against the bias of the free end 306 of a spring, but of engagement with the teeth of the gear 172.

With the lever 238 in the horizontal or post processing position, the operator may then rotate the crank 198 in the same direction as before, i.e., in the direction of the arrow 292. The power input is directed to the second power path via the gear 172 thereby rotating the sheet material roller 100 and the film spool 144 in a clockwise manner, as viewed in FIG. 5. The clockwise rotation of the roller 100 and the film spool 144 is effective to withdraw or unwind the laminate from the take-up roller 40. As the laminate emerges from the left side (as viewed in FIG. 2) of the superposed rollers 36 and 272, the film 142 is stripped from the sheet material 112 and rewound upon the film spool 144 as the sheet material 112 is simultaneously rewound upon its roller 100. As is more fully described in U.S. Pat. No. 4,309,100, in a preferred type of film, the photosensitive or emulsion layer of the film 142 exhibits a greater adhesion to the sheet material 112 than to the next adjacent layer(s) of the film whereby stripping the sheet material 112 from the film 142 serves to remove the emulsion layer thus increasing visual acuity and brightness of the resultant positive transparency and enhancing its stability by virtue of the removal of residual processing reagent in the emulsion. For further details of the film, reference may also be had to U.S. Pat. No. 3,682,637.

In an alternative embodiment, the visible images would be formed in the sheet material. Accordingly, the film would be comprised of a photosensitive layer through which the exposure would be made, vis-a-vis the film 142, and a base which may or may not be transparent. Also, the sheet material would be comprised of a transparent base and an image receiving layer. Subsequent to the exposure of the film, the side of the sheet material containing the image receiving layer would be coated with the processing liquid and brought into engagement or superposition with the side of the film through which the exposure had been made. This may involve reversing the orientation of the film cassette from the position shown in FIG. 2 so as to place the image receiving layer in contact with the emulsion side of the film. After the spreader sheet has been stripped from the film and rewound upon its spool, the spool would be removed and the individual scenes in the sheet material would be cut and mounted for subsequent viewing.

Withdrawing the laminate from the take-up roller 40 causes the latter to rotate in a counterclockwise direction, as viewed in FIG. 2. As the last wrap of the laminate is unwound from the take-up roller 40, the portion of the laminate extending between the bite of the rollers 36 and 272 and the take-up roller 40 pivots the second section 266 about the hinge 264. Also, at this time, the first post 260 moves out of the apertures 261 and 265 thereby releasing the sheet material leader 114 so that it may be fully rewound into the processing kit 42. More specifically, the first post 260 includes a section 277 which extends in cantilever fashion and is tapered in the direction of rotation of the spool 40 during unwinding of the laminate. Thus, as the spool 40 rotates in a counterclockwise direction, the free end of the tapered section 277 also rotates in a counter-clockwise direction relative to the last portion or end of the laminate such that it progressively enters and cams the longitudinally extending portions of the apertures 261 and 265 apart. However, the film leader 146 remains attached to the spool 40 due to the second post 271—aperture 267 connection. Rotation of the crank 198 is continued after release of the leader 114 until it has been completely rewound within the processing kit 42 while the increase in tension in the film activates the clutch 190 thereby preventing any further rotation of the film spool 144. The loading door 14 may then be opened thereby releasing the link 200 for movement back into the position shown in FIG. 3. The kit 42 may now be removed and safely discarded since all materials used in the processing of the film 142 are safely enclosed within the closed kit. Also, at this time, the film leader 146 may be detached from the second post 271, the film cassette 140 removed from the apparatus, and the processed film removed therefrom for subsequent cutting and mounting of the individual scenes.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Processing apparatus for superposing a photographically exposed length of film having a leader containing two apertures therein with a length of sheet material having a leader so as to initiate the formation of a visible image, said apparatus comprising:

a housing defining a lighttight enclosure in which photographically exposed film is adapted to be processed, said housing including means providing access to said enclosure;

means for locating a container having a length of sheet material therein, the sheet material having a trailing end secured to a rotatable member located within the container and a leader having a first aperture therein;

means for supporting a cassette containing a roll of photographically exposed film, the film including a trailing end secured to a rotatable member located within the cassette and a leader having first and second apertures therein;

a spool rotatably supported within said enclosure, said spool including first means to which the leaders of the film and sheet material are to be attached via their first apertures, and second means to which the leader of the film is to be attached by its second aperture;

means for rotating said spool in a first direction so as to wind a laminate comprising the film and sheet material in superposition upon said spool with a layer of processing liquid located between the film and sheet material for a period of time sufficient for a visible image to form in the laminate, said rotating means being further constructed to subsequently drive the rotatable members in the sheet material container and the cassette so as to unwind the laminate from said spool thereby causing said spool to rotate in a second direction while simultaneously rewinding the sheet material into its container and the film into its cassette; and said first means of said spool being constructed so as to move out of the first aperture in both the sheet material leader and the film leader when the laminate has been completely unwound from said spool while said second means is constructed to maintain its attachment with the film leader via the second aperture therein, whereby the sheet material is free to be completely returned to its container upon continued rotation of its rotatable member while the film is prevented from being completely returned to its cassette.

2. Processing apparatus as defined in claim 1 wherein said first means includes a first portion having a curved surface facing in said first direction of rotation of said spool and a second section which extends in cantilever fashion in said second direction of rotation of said spool, said curved surface being effective to transfer rotative force of said spool to the film leader and sheet material leader during winding thereof onto said spool.

3. Processing apparatus as defined in claim 2 wherein said second section of said first means is tapered in the direction of said second direction of rotation of said spool so as to facilitate withdrawal of said first means from the first apertures of the sheet material leader and the film leader.

4. Processing apparatus as defined in claim 1 wherein the spacing between said first and second means is less than the corresponding spacing between the first and second apertures in the film leader.

5. Processing apparatus as defined in claim 1 wherein said spool further includes means for assisting the user in the correct orientation of the leader of the sheet material relative to said first means.

6. A photographic film assemblage including:

a film cassette including means defining an opening through which a length of film may be moved into or out of said film cassette;

a film spool rotatably supported within said film cassette; and a length of film including a leader wound about said film spool with said leader beig adapted to extend to the exterior of said film cassette via said opening, said leader including means defining first and second apertures which are adapted to receive first and second posts which extend from a take-up roller for connecting said leader to the take-up roller, said means for defining said first and second apertures being spaced from each other such that rotation of the take-up roller in a direction which will withdraw said film from said film cassette is transmitted by the first post to said leader only by said means defining said first aperture, and during rewinding of said film onto said film spool and unwinding it from the take-up roller, said means defining said first aperture automatically detaches from the first post while said means defining said second aperture cooperates with the second post on the take-up roller to maintain connection between said leader and the take-up roller whereby said leader is prevented from being fully rewound into said film cassette.

7. A photographic film assemblage as defined in claim 6 wherein said means defining said first aperture has a generally keyhole configuration with a generally enlarged head portion of the keyhole located closest to the free end of the leader.

8. A photographic film assemblage as defined in claim 7 wherein said means defining said second aperture has a generally D-shaped configuration including a major edge located adjacent the free end of said leader.

9. A photographic film assemblage as defined in claim 8 wherein the distance between said head portion and said major edge, as measured along the length of said leader, is greater than the corresponding spacing between the first and second posts.

* * * * *